(12) United States Patent
Mueller-Weinfurtner

(10) Patent No.: US 8,429,215 B2
(45) Date of Patent: Apr. 23, 2013

(54) ADAPTIVE FILTER FOR CHANNEL ESTIMATION WITH ADAPTIVE STEP-SIZE

(75) Inventor: Stefan Mueller-Weinfurtner, Nuremburg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 1138 days.

(21) Appl. No.: 12/347,850

(22) Filed: Dec. 31, 2008

(65) Prior Publication Data
US 2009/0181637 A1      Jul. 16, 2009

Related U.S. Application Data

(63) Continuation-in-part of application No. PCT/IB2007/052427, filed on Jul. 22, 2007.

(30) Foreign Application Priority Data
Jul. 3, 2006    (EP) ..................................... 06116499

(51) Int. Cl.
*G06F 17/10*    (2006.01)

(52) U.S. Cl.
USPC .......................................................... 708/322

(58) Field of Classification Search ................... 708/322
See application file for complete search history.

(56) References Cited

U.S. PATENT DOCUMENTS

| 4,349,889 | A  | * | 9/1982  | van den Elzen et al. ....... 708/322 |
| 5,475,632 | A  | * | 12/1995 | Sugiyama ..................... 708/322 |
| 2001/0043650 | A1 |   | 11/2001 | Sommer et al. |
| 2003/0078025 | A1 |   | 4/2003  | Smee et al. |
| 2003/0126170 | A1 | * | 7/2003  | Ling et al. ..................... 708/322 |
| 2005/0201454 | A1 |   | 9/2005  | Chaudhuri et al. |
| 2006/0098766 | A1 |   | 5/2006  | Pietraski et al. |

FOREIGN PATENT DOCUMENTS

| EP | 0529585 A2  | 3/1993  |
| EP | 1052784 A1  | 11/2000 |
| WO | 9418752 A1  | 8/1994  |

* cited by examiner

*Primary Examiner* — Tan V. Mai
(74) *Attorney, Agent, or Firm* — Potomac Patent Group PLLC

(57) ABSTRACT

A receiving apparatus for a digital mobile communication system comprises an adaptive filter for filtering an input signal. A step-size parameter chosen for the adaption of filter coefficients of the adaptive filter is computed from a variation of the filter coefficients used by the adaptive filter. This facilitates an indirect measure for the channel variation so that a good reception quality over a wide range of user velocities may be enabled in contrast to a system design based on a compromise step-size parameter being optimum for one velocity only.

15 Claims, 1 Drawing Sheet

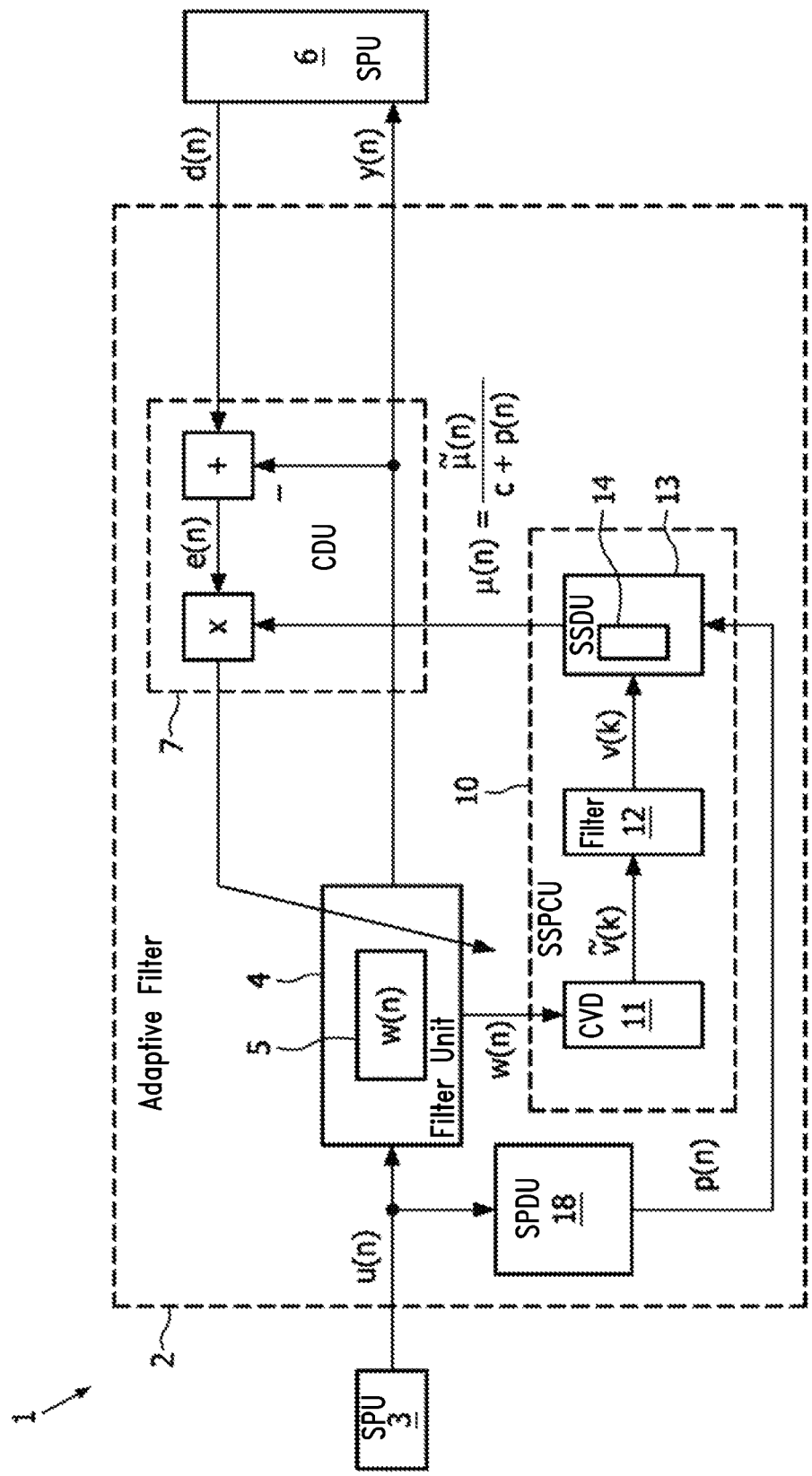

ADAPTIVE FILTER FOR CHANNEL ESTIMATION WITH ADAPTIVE STEP-SIZE

BACKGROUND

1. Technical Field

The present disclosure relates to an adaptive filter for filtering an input signal, especially for filtering an input signal received over a mobile data network of a mobile communications system, and to a method for filtering such an input signal.

2. Description of the Related Art

EP 1 052 784 A1 describes an adaptive filtering for mobile communication systems and particularly for digital mobile phone systems. The method of EP 1 052 784 A1 determines filter coefficients of an adaptive filter in dependence on a detected error signal and a step size. Thereby, the step size for determining the filter coefficients is varied in dependence on an estimated frequency shift of a received signal from a nominal frequency value. The signal receiving method makes use of a Doppler frequency estimator to estimate the Doppler frequency from the difference between the expected frequency and the actual frequency.

The method of EP 1 052 784 A1 has the disadvantage that an additional Doppler frequency estimation is necessary, and hence means must be provided to measure the signal frequency and to estimate the Doppler frequency. The method of EP 1 052 784 A1 has the further disadvantage that only an indirect adaption of the step size for the adaptive filtering method with respect to effects based on a mobile phone speed is achieved.

BRIEF SUMMARY

In an embodiment, an adaptive filter for filtering an input signal, a receiving apparatus comprising such an adaptive filter and an adaptive filtering method with an improved receiving performance are provided, especially with an improved adaption of a step-size parameter.

In an embodiment, an efficient and simple method for adaption of the step-size is provided and may be used in a wide field of applications. In an embodiment, a further advantage is that the computational burden is reduced and that the step-size adaption is not limited to one specific cause of deterioration, for example, a variation in the velocity of the mobile device comprising an embodiment of an adaptive filter, because it is based more on the effect of such a cause than on the cause itself. Hence, embodiments may be general applicable to digital communication via a time-varying dispersive propagation channel.

In an embodiment, the step-size parameter control unit determines the channel variation quantity on the basis of an auxiliary quantity based on a scalar product of a vector of filter coefficients from a first timing for the auxiliary quantity and a vector of filter coefficients from a second timing for the auxiliary quantity. Hence, the channel variation quantity is based on a deviation of the filter coefficients from the second timing with respect to the filter coefficient from the first timing. In an embodiment, this has the advantage that the channel variation quantity is calculated on the basis of values already provided by means of the adaptive filter. The vector of filter coefficients may be chosen from a vector space over the field of complex numbers. The dimension of this vector space depends on the specific application, and is not necessarily predetermined and may also vary over time.

In an embodiment, it is further advantageous that the step-size parameter control unit determines the auxiliary quantity on the basis of a fraction value having a numerator that is an absolute value of the scalar product of a vector of filter coefficients from the first timing for the auxiliary quantity and a vector of filter coefficients from the second timing for the auxiliary quantity, and a denominator that is a sum of a square value of a norm of a vector of the filter coefficients from the first timing for the auxiliary quantity and a square value of a norm of a vector of the filter coefficients from the second timing of the auxiliary quantity. In an embodiment, this has the advantage that an instantaneous measure, that is the auxiliary quantity, quantifying the amount of change in the channel is obtained that may be computed in every or after a specific number of adaptive filtering time steps.

In an embodiment, the step-size parameter control unit may determine the channel variation quantity on the basis of two or more auxiliary quantities. For example, the step-size parameter control unit may determine the channel variation quantity as an average of two or more auxiliary quantities. The step-size parameter control unit may comprise a finite response filter or an infinite response filter. In case of an infinite response filter, the channel variation quantity is based on all or a subset of all preceding auxiliary quantities.

In an embodiment, it is advantageous that the step-size parameter control unit determines the step-size parameter on the basis of a fraction value comprising a numerator that comprises the channel variation quantity, and a denominator that comprises the signal power of the input signal. In an embodiment, it is advantageous that the denominator comprises a sum of the signal power of the input signal and a small constant so that possible divisions by zero are avoided. In another embodiment, the actual value of the denominator, especially the amount of the signal power of the input signal, may eventually be raised to a small number before being used for division.

These and other aspects of embodiments will be apparent from and elucidated with reference to the embodiments described hereinafter.

In an embodiment, an adaptive filter for filtering an input signal, especially for filtering an input signal received over a mobile data network, comprises: a filter coefficients storage unit for storing filter coefficients; a filter coefficients determination unit for determining adapted filter coefficients on the basis of at least said filter coefficients, an error signal and a step-size parameter; and a step-size parameter control unit for controlling said step-size parameter, wherein said step-size parameter control unit determines a channel variation quantity on the basis of a variation of at least a filter coefficient stored in said filter coefficient storage unit, and wherein said step-size parameter control unit controls said step-size parameter on the basis of at least said channel variation quantity. In an embodiment, said step-size parameter control unit determines said channel variation quantity on the basis of at least an auxiliary quantity based on a scalar product of a vector of filter coefficients from a first timing for said auxiliary quantity and a vector of filter coefficients from a second timing for said auxiliary quantity. In an embodiment, said step-size parameter control unit determines said auxiliary quantity on the basis of a fraction value having a numerator that consists of an absolute value of said scalar product of a vector of filter coefficients from said first timing for said auxiliary quantity and a vector of filter coefficients from said second timing for said auxiliary quantity, and a denominator that consists of a sum of a square value of a norm of a vector of said filter coefficients from said first timing for said auxiliary quantity and a square value of a norm of a vector of said filter coefficients from said second timing of said auxiliary quantity. In an embodiment, the step-size parameter control unit determines said channel variation quantity as an average of at least two auxiliary quantities. In an embodiment, said step-size parameter control unit repeatedly determines said channel variation quantity on the basis of at least an actual auxiliary quantity. In an embodiment, said step-size parameter control unit comprises an infinite response filter, wherein said step-size parameter control unit is adapted so that said auxiliary quantities are input to said infinite response filter, and adapted to determine said channel variation quantity as an output of said infinite response filter. In an embodiment, a distance between said first timing and said second timing for each of said auxiliary quantities is predetermined. In an embodiment, said step-size parameter control unit determines said step-size parameter on the basis of a fraction value consisting of a numerator that is a further channel variation quantity based on said channel variation quantity, and a denominator that comprises a signal power of said input signal. In an embodiment, said step-size parameter control unit comprises a table defining a mapping between said channel variation quantity and said further channel variation quantity and that said further channel variation is determined from said channel variation quantity from said mapping defined by said table. In an embodiment, said filter coefficients determination unit is adapted to determine said error signal on the basis of a difference between a desired signal and an output signal, wherein said output signal is determined on the basis of a scalar product of a vector of said filter coefficients and a vector of a filter input derived from said input signal. In an embodiment, a receiving apparatus, especially a mobile device for digital mobile communication systems, comprises an adaptive filter.

In an embodiment, an adaptive filtering method for filtering an input signal, especially for filtering an input signal received over a mobile data network, comprises: determining adapted filter coefficients on the basis of actual filter coefficients, an error signal and a step-size parameter; determining a channel variation quantity on the basis of a variation of at least a filter coefficient; and controlling said step-size parameter on the basis of said channel variation quantity determined.

In an embodiment, an adaptive filter for filtering an input signal comprises: a filter coefficients storage unit configured to store filter coefficients; a filter coefficients determination unit configured to determining adapted filter coefficients based on the filter coefficients, an error signal and a step-size parameter; and a step-size parameter control unit configured to determine a channel variation quantity based on a variation of a filter coefficient stored in the filter coefficient storage unit and to determine the step-size parameter based on the channel variation quantity. In one embodiment, the step-size parameter control unit is configured to determine the channel variation quantity based on an auxiliary quantity based on a scalar product of a vector of filter coefficients from a first timing for the auxiliary quantity and a vector of filter coefficients from a second timing for the auxiliary quantity. In one embodiment, the step-size parameter control unit is configured to determine the auxiliary quantity on the basis of a fraction value having an absolute value of the scalar product of a vector of filter coefficients from the first timing for the auxiliary quantity and a vector of filter coefficients from the second timing for the auxiliary quantity as a numerator, and having a sum of a square value of a norm of a vector of the filter coefficients from the first timing for the auxiliary quantity and a square value of a norm of a vector of the filter coefficients from the second timing of the auxiliary quantity as a denominator. In one embodiment, the step-size parameter control unit is configured to determine the channel variation quantity as an average of at least two auxiliary quantities. In one embodiment, the step-size parameter control unit is configured to repeatedly determine the channel variation quantity on the basis of at least an actual auxiliary quantity. In one embodiment, the step-size parameter control unit comprises an infinite response filter configured to receive the auxiliary quantities and to output the channel variation quantity. In one embodiment, a distance between the first timing and the second timing for each of the auxiliary quantities is predetermined. In one embodiment, the step-size parameter control unit is configured to determine step-size parameter based on a fraction value having a numerator that is a further channel variation quantity based on the channel variation quantity, and a denominator that comprises a signal power of the input signal. In one embodiment, the step-size parameter control unit comprises a table defining a mapping between the channel variation quantity and the further channel variation quantity and the further channel variation is determined from the channel variation quantity from the mapping defined by the table. In one embodiment, the filter coefficients determination unit is adapted to determine the error signal based on a difference between a desired signal and an output signal, wherein the output signal is determined based on a scalar product of a vector of the filter coefficients and a vector of a filter input derived from the input signal.

In one embodiment, a system comprises: a filter coefficients storage unit configured to store filter coefficients; a filter coefficients determination unit configured to determining adapted filter coefficients based on the filter coefficients, an error signal and a step-size parameter; and a step-size parameter control unit configured to determine a channel variation quantity based on a variation of a filter coefficient stored in the filter coefficient storage unit and to determine the step-size parameter based on the channel variation quantity.

In one embodiment, an adaptive method for filtering an input signal comprises: determining adapted filter coefficients based on actual filter coefficients, an error signal, and a step-size parameter; determining a channel variation quantity based on a variation of a filter coefficient; and determining the step-size parameter based on the channel variation quantity.

In one embodiment, a computer readable memory medium comprises contents that cause a computing device to implement a method of filtering an input signal, the method including: determining adapted filter coefficients based on actual filter coefficients, an error signal, and a step-size parameter; determining a channel variation quantity based on a variation of a filter coefficient; and determining the step-size parameter based on the channel variation quantity.

BRIEF DESCRIPTION OF THE SEVERAL VIEWS OF THE DRAWINGS

The present disclosure will become readily understood from the following description of embodiments thereof made with reference to the accompanying drawing, in which:

FIG. 1 shows a functional block diagram of a receiving apparatus comprising an adaptive filter according to an embodiment.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

FIG. 1 shows a schematic block diagram of an embodiment of a receiving apparatus 1 comprising an adaptive filter 2 according to an embodiment. The receiving apparatus 1 may be used in telecommunication systems such as UMTS. A particularly advantageous application is for high-speed downlink packet access (HSDPA) as described within the 3GPP UMTS FDD (3rd generation partnership project UMTS frequency division duplex) framework. The receiving apparatus 1 may be a part of a handheld terminal, or mobile phone, or another, especially battery powered, apparatus. The receiving apparatus 1, the adaptive filter 2 and the method of the invention may also be used in or processed by other equipment.

The receiving apparatus 1 comprises a preceding signal processing unit 3 that outputs data of an input signal u for the adaptive filter 2 in form of a tap input vector u(n) at timing n. The signal processing unit 3 arranges input samples in the vector u(n), wherein the vector u(n) comprises M complex valued components. M is an integer greater than zero, when the filter unit 4 is a filter unit 4 with a finite response. In case of an infinite response, the vector u(n) comprises a infinite number of components. In this description of an embodiment, unless otherwise noted, a finite response of the filter unit 4 is assumed.

The adaptive filter 2 comprises a filter unit 4. The filter unit 4 receives the tap input vector u(n). The filter unit 4 comprises a filter coefficients storage unit 5 for storing filter coefficients in a vector w(n). In this embodiment, the filter coefficients vector w(n) is a tap-weight vector w(n) having M complex valued components.

The response of the filter unit 4 is described by the filter coefficients vector w(n). The filter unit 4 may preferably have a finite response. The filter output y(n) of the filter unit 4 may be described as a scalar product of the vector of the filter coefficients w(n) at timing n and the tap input vector u(n) at timing n. Hence, the output signal or filter response y(n) is a complex number.

During processing of the input signal u, the adaptive filter 2 provides an adaption of the vector of filter coefficients w(n).

The filter response y(n) is output from the adaptive filter 2 to a further signal processing unit 6. The further signal processing unit 6 is adapted to output a desired signal d(n). A filter coefficients determination unit FDU 7 of the adaptive filter 2 receives this desired signal d(n) and determines an error signal e(n) for timing n as the difference between the desired signal d(n) and the filter response y(n) for timing n. Hence, the error signal e(n) for timing n is a complex number. During processing of the input signal u the estimated error e(n) for timing n may be calculated as:

$$e(n)=d(n)-y(n). \tag{1}$$

The adaptive filter 2 comprises a step-size parameter control unit SSPCU 10 for controlling a step-size parameter $\mu(n)$. The step-size parameter $\mu(n)$ is output to the filter coefficients determination unit 7. The filter coefficients determination unit 7 determines adapted filter coefficients w(n+1) for a timing n+1 on the basis of the previous filter coefficients w(n), the error signal e(n) for timing n, the step-size parameter $\mu(n)$ for timing n and the input signal vector u(n) for timing n. The vector of filter coefficients w(n+1) may be preferably determined as the sum of the filter coefficients vector w(n) and a product between a complex scalar that is the product between the step-size parameter $\mu(n)$ for timing n and the complex-conjugate of the error signal e(n) at timing n, and the tap input vector u(n) at timing n:

$$w(n+1)=w(n)+\mu(n) \cdot e^*(n) \cdot u(n), \tag{2}$$

wherein e*(n) is the complex-conjugate of the error signal e(n) at timing n. It is noted that the step-size parameter $\mu$ depends on the timing n.

The step-size parameter control unit 10 controls the step-size parameter $\mu(n)$ with respect to a variation of at least a part of the vector of filter coefficients w(n) stored in the filter coefficients storage unit 5 of the filter unit 4. The filter coefficients w(n) are transmitted to a channel variation determination unit 11. In this exemplary embodiment, the channel variation determination CVD unit 11 determines an auxiliary quantity v(k) on the basis of the vector of filter coefficients w at two different timings n1 and n2. Specially, the channel variation determination unit 11 may determine the auxiliary quantity v(k) as a fraction value having a numerator that is an absolute value of a scalar product of a vector of filter coefficients w(n1) at a first timing and a vector of filter coefficients w(n2) for a second timing n2 and a denominator that is a sum of a square value of a norm of the vector of the filter coefficients w(n1) for the first timing n1 and a square value of a norm of the vector of the filter coefficients w(n2) at a second timing n2.

$$v(k)=|\langle w(n1), w(n2)\rangle|/(|w(n1)|^2+|w(n2)|^2) \tag{3}$$

Thereby, k may be an index depending on the first timing n1 and the second timing n2. For example, the distance between the first timing n1 and the second timing n2 may be predetermined and fixed to a value N. The auxiliary quantity v(k) for succeeding values of the index k may then be determined with respect to the setting of n2=k·N and n1=(k-1)·N, wherein k is a positive integer.

A more general determination of the auxiliary quantity may be based on another instantaneous measure $v_0$ quantifying the amount of change in the channel. For example, the channel variation determination unit 11 may compute in every N-th adaptive filtering time step:

$$v_0(k)=(\min_\phi |w(k \cdot N)-\exp(j \cdot \phi) \cdot w((k-1) \cdot N)|^2)/ \\ (|w(k \cdot N)|^2+|w((k-1) \cdot N)|^2) \tag{4}$$

Thereby, j is the complex number satisfying $j^2=-1$ and $\phi$ is a real number, especially a non-negative real number that is lower than $2 \cdot \pi$. The minimum min may be determined with respect to the varying parameter $\phi$ for every filtering time step k. The equation (4) may also be written as:

$$v_0(k)=(\min_{100}(|w(k \cdot N)|^2+|w((k-1) \cdot N)|^2-2 \cdot \\ Re(\exp(-j \cdot \phi) \cdot \langle w((k-1) \cdot N), w(k \cdot N)\rangle))/ \\ (|w(k \cdot N)|^2+|w((k-1) \cdot N)|^2) \tag{5}$$

and after performing the minimization step the following is achieved:

$$v_0(k)=1-(2 \cdot |\langle w((k-1) \cdot N), w(k \cdot N)\rangle|/(|w(k \cdot N)|^2+|w((k-1) \cdot N)|^2)) \tag{6}$$

When subtraction and scaling is omitted in formula (6), formula (3) is achieved with the specific setting n1=(k−1)·N and n2=k·N. It is noted that a more general form of formulas (4), (5) and (6) may be derived, when writing n1 instead of (k=1)·N and n2 instead of k·N.

The auxiliary quantity v determined by the channel variation determination unit 11 on the basis of a variation of the filter coefficients w stored in the filter coefficients storage unit 5 according to formula (3) is transmitted to a filter unit 12 of the step-size parameter control unit 10. In this embodiment, the filter unit 12 is arranged as an infinite response filter 12. The filter unit 12 calculates a channel variation quantity v(k) on the basis of the auxiliary quantities v received. For example, the filter unit 12 may determine the channel variation quantity v(k) for the adaptive filtering time step k according to the formula:

$$v(k)=\alpha \cdot v(k-1)+(1-\alpha)\cdot v(k) \qquad (7)$$

with a suitable choice of the forgetting factor a. Thereby, the forgetting factor a may be determined by the time period in which the user equipment velocity can be assumed to be constant. Hence, the filter unit 12 may be arranged as an averaging filter unit 12 that smoothes the signal v.

The channel variation quantity v(k) is sent to a step-size determination unit 13. The step-size determination unit 13 comprises a table 14 to provide a mapping between different values for the channel variation quantity v(k) and a further channel variation quantity μ(n). Alternatively, the further channel variation quantity μ(n) may be calculated from the channel variation quantity v(k) on the basis of a function, which may be predetermined.

The step-size determination unit 13 of the step-size parameter control unit 10 determines the step-size parameter μ(n) on the basis of the channel variation quantity μ(n). Therefore, it may be advantageous to include a normalization. Such a normalization may be based on the power of the input signal u, as described below.

The input signal u(n) for timing n is transmitted to a signal power determination unit 18 of the adaptive filter 2. The signal power determination unit 18 may calculate the signal power p(n) for timing n of the input signal u(n) of timing n as the square value of the absolute value of the input signal u(n) for timing n:

$$p(n)=|u(n)|^2. \qquad (8)$$

It is noted that the input signal u(n) for timing n is a vector so that the absolute value of the input signal u(n) for timing n equals the magnitude of the vector u(n) for timing n. Thereby, the number M of components of the vector of the input signal u(n) is equal to the number M of components of the tap-weight vector w(n). Hence, a finite response of the filter unit 4 is assumed. It is noted that the normalization with respect to the power of the input signal u is a feature of a normalized least mean square (NLMS) calculation used as an example to describe an embodiment.

The power p(n) of the input signal u(n) at timing n is transmitted from the signal power determination unit 18 to the step-size determination unit 13 of the step-size parameter control unit 10. The step-size determination unit 13 determines the step-size parameter on the basis of the channel variation quantity μ(n) and the signal power p(n). To take care of possible situations in which the signal power p(n) is below a specific threshold value, a small constant c may be used to avoid a division by zero. For example, the step-size determination unit 13 determines the step-size parameter μ(n) as a fraction value consisting of a numerator that comprises the channel variation quantity μ(n), and a denominator that comprises the signal power p(n) of the input signal u:

$$\mu(n)=\mu(n)/(c+p(n)), \qquad (9)$$

wherein c is a small non-negative real value.

The filter coefficients determination unit 7 may calculate the adapted tap-weight vector w(n+1) on the basis of the step-size parameter μ(n) according to the formula (2).

The characteristic features of an embodiment of the filter unit 4 may be described by the filter coefficients w(n). Hence, the output signal y(n) may be determined by the scalar product between the filter coefficients w(n) and the input signal u(n):

$$y(n)=\langle w(n), u(n) \rangle. \qquad (10)$$

The amount of the filter coefficients change per step may be influenced via the step-size parameter μ, which influences convergence speed, channel tracking behavior and stability of the adaption. The adaptive filter 2 of the receiving apparatus 1 may make use of a least-mean-square (LMS) algorithm that is a member of the family of stochastic gradient algorithms. A significant feature of the LMS algorithm is its simplicity. Moreover, it does not require measurements of pertinent correlation functions, nor does it require matrix inversion. The LMS algorithm is a linear adaptive filtering algorithm that comprises two main steps: First, a filtering process, which involves computing the output y of the filter unit 4 produced by the vector of the input signal u, and generating an estimation error e by comparing this output y to the desired response d. Second, an adaptive process, which involves the automatic adjustment of the tap-weights w of the filter unit 4 stored in the filter coefficients storage unit 5 in accordance with the estimation error e. In an embodiment, the combination of these steps working together constitutes a feedback loop of the LMS algorithm, as shown in FIG. 1. Hence, the LMS algorithms involves feedback in its operation so that the related issue of stability is raised. In this context, a meaningful criterion may be to require that the mean-squared error produced by the LMS algorithm at timing n is a convergent sequence over n that converts to a constant. Hence, for a LMS algorithm convergent is meant in the sense of convergent in the mean square, as defined before. For the LMS algorithm to satisfy this criterion, the auxiliary quantity μ(n), as used in formula (9), may satisfy a certain condition related to the eigenstructure of the correlation matrix of the tap inputs. In case of the normalized LMS algorithm the auxiliary quantity μ(n) may satisfy the condition that μ(n) is greater than zero and smaller than two for almost all timings n. With respect to this example criterion, the values of μ(n) stored in the table 14 may be chosen within the range from 0 to 2.

The above description is advantageous, for example, for the usual continuous operation mode. In this continuous reception, the filter coefficients w may be initialized and adapted to ensure fast convergence at the beginning of the data burst. If a separate channel estimation unit is available outside to describe adaptive filtering functionality, as shown in FIG. 1, a possible embodiment is to use the channel estimates and initialize the filter coefficients w to represent the matched filter solution. Other initializations are also possible. Further, the step-size parameter μ(n) during the first fraction of the filtering and adaption steps may be chosen higher than indicated by μ(n). For example, 2·μ(n) can be used during those first steps and reduced to μ(n) after the given number of steps.

A large step-size parameter μ(n) or a temporary increase by, for example, a factor of two, may enable better tracking in channels with large variation, like observed at high user equipment velocity. On the other hand, it may produce large gradient noise in nearly static channel conditions, for example, if the user equipment is moving slowly. If the step-size parameter μ(n) is chosen too large, the adaptive filter 2 may even become instable. Lower step-size parameters μ(n) leads to better signal quality due to a reduced gradient noise, but tracking in fast channels becomes cumbersome. Hence, a fixed step-size parameter may not optimal most of the time. Therefore, an embodiment uses a step-size parameter μ(n) that depends on the channel condition varying with time (and not only on the signal power). Thereby, the user equipment velocity need not be measured explicitly, but a meaningful measure for the rate of channel change during some time interval may be used. A possible indication value is described by the auxiliary quantity v(k), as defined by any one of formulas (4), (5) or (6). This indication value described by the auxiliary quantity v(k) may be averaged by the filter unit 12 according to formula (7). The smoothed output of the filter unit 12, that is the channel variation quantity v(k), may be mapped to a step-size parameter μ(n) via the table 14. By taking into account a suitable estimate of instantaneous filter input power p, the step-size parameter μ(n) may be determined according to formula (9).

It is noted that the step-size parameter μ(n) based on any one of formulas (4), (5) or (6) may be used for the next N filtering and adaption steps.

Although exemplary embodiments have been disclosed, it will be apparent to those skilled in the art that various changes and modifications can be made which will achieve some of the advantages of embodiments without departing from the spirit and scope of the disclosure. Such modifications are intended to be covered by the appended claims in which the reference signs shall not be construed as limiting the scope. Further, in the description and the appended claims the meaning of "comprising" is not to be understood as excluding other elements or steps. Further, "a" or "an" does not exclude a plurality, and a single processor or other unit may fulfill the functions of several means recited in the claims.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An adaptive filter for filtering an input signal, the filter comprising:
    a filter coefficients storage unit configured to store filter coefficients;
    a filter coefficients determination unit configured to determining adapted filter coefficients based on the filter coefficients, an error signal and a step-size parameter; and a step-size parameter control unit configured:
   to determine a channel variation quantity based:
      on a variation of a filter coefficient stored in the filter coefficient storage unit; and
      on an auxiliary quantity based on a scalar product of a vector of filter coefficients from a first timing for the auxiliary quantity and a vector of filter coefficients from a second timing for the auxiliary quantity; and
   to determine the step-size parameter based on the channel variation quantity.

2. The adaptive filter of claim 1 wherein the step-size parameter control unit is configured to determine the auxiliary quantity on the basis of a fraction value having an absolute value of the scalar product of a vector of filter coefficients from the first timing for the auxiliary quantity and a vector of filter coefficients from the second timing for the auxiliary quantity as a numerator, and having a sum of a square value of a norm of a vector of the filter coefficients from the first timing for the auxiliary quantity and a square value of a norm of a vector of the filter coefficients from the second timing of the auxiliary quantity as a denominator.

3. The adaptive filter of claim 1 wherein the step-size parameter control unit is configured to determine the channel variation quantity as an average of at least two auxiliary quantities.

4. The adaptive filter of claim 3 wherein the step-size parameter control unit is configured to repeatedly determine the channel variation quantity on the basis of at least an actual auxiliary quantity.

5. The adaptive filter of claim 4 wherein the step-size parameter control unit comprises an infinite response filter configured to receive the auxiliary quantities and to output the channel variation quantity.

6. The adaptive filter of claim 5 where a distance between the first timing and the second timing for each of the auxiliary quantities is predetermined.

7. The adaptive filter of claim 1 wherein the step-size parameter control unit is configured to determine step-size parameter based on a fraction value having a numerator that is a further channel variation quantity based on the channel variation quantity, and a denominator that comprises a signal power of the input signal.

8. The adaptive filter of claim 7 wherein the step-size parameter control unit comprises a table defining a mapping between the channel variation quantity and the further channel variation quantity and the further channel variation is determined from the channel variation quantity from the mapping defined by the table.

9. The adaptive filter of claim 1 wherein the filter coefficients determination unit is adapted to determine the error signal based on a difference between a desired signal and an output signal, wherein the output signal is determined based on a scalar product of a vector of the filter coefficients and a vector of a filter input derived from the input signal.

10. The adaptive filter of claim 1, wherein the step-size parameter control unit determines the auxiliary quantity according to the expression:

$$(\min_\phi |w(n2) - \exp(j \cdot \phi) \cdot w(n1)|^2) / (|w(n2)|^2 + |w(n1)|^2)$$

wherein $\phi$ is a real number, j is a complex number satisfying $j^2 = -1$, w(n1) is the vector of filter coefficients at the first timing and w(n2) is the vector of filter coefficients at the second timing.

11. The adaptive filter of claim 1, wherein the step-size parameter control unit determines the auxiliary quantity according to the expression:

$$(\min_\phi (|w(n2)|^2 + |w(n1)|^2 - 2 \cdot \mathrm{Re}(\exp(-j \cdot \phi) \cdot \langle w(n1), w(n2) \rangle))) / (|w(n2)|^2 + |w(n1)|^2)$$

wherein $\phi$ is a real number, j is a complex number satisfying $j^2 = -1$, w(n1) is the vector of filter coefficients at the first timing and w(n2) is the vector of filter coefficients at the second timing.

12. The adaptive filter of claim 1, wherein the step-size parameter control unit determines the auxiliary quantity according to the expression:

$$1 - (2 \cdot |\langle w(n1), w(n2) \rangle| / (|w(n2)|^2 + |w(n1)|^2))$$

wherein w(n1) is the vector of filter coefficients at the first timing and w(n2) is the vector of filter coefficients at the second timing.

13. A system, comprising:
a signal processing unit; and
an adaptive filter coupled to the signal processing unit and having:
   a filter coefficients storage unit configured to store filter coefficients;
   a filter coefficients determination unit configured to determining adapted filter coefficients based on the filter coefficients, an error signal and a step-size parameter; and
   a step-size parameter control unit configured:
      to determine a channel variation quantity based:
         on a variation of a filter coefficient stored in the filter coefficient storage unit; and
         on an auxiliary quantity based on a scalar product of a vector of filter coefficients from a first timing for the auxiliary quantity and a vector of filter coefficients from a second timing for the auxiliary quantity; and
      to determine the step-size parameter based on the channel variation quantity.

14. An adaptive method for filtering an input signal in a filter, the method comprising:
determining adapted filter coefficients based on actual filter coefficients, an error signal, and a step-size parameter;
determining a channel variation quantity based:
   on a variation of a filter coefficient; and
   on an auxiliary quantity based on a scalar product of a vector of filter coefficients from a first timing for the auxiliary quantity and a vector of filter coefficients from a second timing for the auxiliary quantity;
determining the step-size parameter based on the channel variation quantity.

15. A non-transitory computer readable memory medium storing instructions that, when executed, cause a computing device to implement a method of filtering an input signal, the method comprising:
determining adapted filter coefficients based on actual filter coefficients, an error signal, and a step-size parameter;
determining a channel variation quantity based:
   on a variation of a filter coefficient; and
   on an auxiliary quantity based on a scalar product of a vector of filter coefficients from a first timing for the auxiliary quantity and a vector of filter coefficients from a second timing for the auxiliary quantity;
determining the step-size parameter based on the channel variation quantity.

* * * * *